United States Patent
Matsuoka et al.

(10) Patent No.: US 6,563,978 B2
(45) Date of Patent: May 13, 2003

(54) OPTICAL TRANSMISSION SYSTEM AND OPTICAL COUPLER/BRANCHING FILTER

(75) Inventors: Tadashi Matsuoka, Yokohama (JP); Junya Kosaka, Yokohama (JP); Tetsushi Nakano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 09/813,220

(22) Filed: Mar. 19, 2001

(65) Prior Publication Data

US 2001/0024544 A1 Sep. 27, 2001

(30) Foreign Application Priority Data

Mar. 22, 2000 (JP) .......................... 2000-084705

(51) Int. Cl.[7] .......................... G02B 6/28; H04B 10/00; H04B 10/12
(52) U.S. Cl. .......................... 385/24; 359/161; 359/173
(58) Field of Search .......................... 385/24, 16, 37; 359/124, 127, 161, 173

(56) References Cited

U.S. PATENT DOCUMENTS 6,445,850 B1 * 9/2002 Zhou et al. .................... 385/24

2001/0013966 A1 * 8/2001 Ishida et al. .................... 359/161

FOREIGN PATENT DOCUMENTS

| JP | 07301831 | 5/1994 |
| JP | 11275007 | 10/1999 |

* cited by examiner

Primary Examiner—Hemang Sanghavi
(74) Attorney, Agent, or Firm—Townsend and Townsend/and Crew LLP

(57) ABSTRACT

The objective is an optical transmission unit capable of coupling and branching signal lights of individual wavelengths at a data rate of 10 Gbits/s. In order to achieve the objective, DCFs are provided and proper values of dispersion compensation are given, so that different characteristics depending on the respective wavelengths to be coupled, split and pass through without being split are obtained. The signal lights are amplified by a plurality of low-excitation optical amplifiers to regain their light levels which are weakened due to using an optical coupler, branching filter and DCF together, thereby enabling a long-distance transmission.

6 Claims, 8 Drawing Sheets

OPTICAL TRANSMISSION SYSTEM AND OPTICAL COUPLER/BRANCHING FILTER

BACKGROUND OF THE INVENTION

The present invention relates to a transmission system and an optical splitting unit, and particularly to a wavelength division multiplexing (WDM) transmission system for transmitting signal lights of different wavelengths and an optical coupler/branching filter used for the system.

The recent growing traffic of data attributable to the prevalence of the Internet and the like necessitates the increase in the transmission capacity of an optical fiber cable. WDM and speed-up of transmission are possible schemes for the increase of transmission capacity.

The WDM system is designed to transmit a number of signal lights of different wavelengths based on multiplexing through an optical fiber cable. Based on the splitting and coupling of part of multiplexed signal lights, it becomes possible for an optical fiber capable of transmitting the signal lights not only between two places but among a number of places.

There is proposed, for a data rate of 2.4 Gbits/s, a method of splitting and coupling part of wavelengths at once by disposing an optical coupler/branching filter formed of passive parts between optical amplifiers. A technique relevant to this method is described in Japanese Patent Laid-open (Kokai) No. Hei 11-275007.

At a data rate of 10 Gbits/s which is four times the 2.4 Gbits/s, the influence of light dispersion on the transmission path is not negligible and the compensation against dispersion is required. A technique pertinent to the dispersion compensation is described in Japanese Patent Laid-open (Kokai) No. Hei 7-301831.

However, for the transmission at 10 Gbits/s on a transmission path of usual optical fiber (non-dispersion shifted fiber: NDSF), it is difficult for the above-mentioned conventional WDM technique to equip necessary dispersion compensating fibers (DCF). The transmission at 10 Gbits/s necessitates DCFs of different characteristics depending on the respective wavelengths to be coupled, split and passed through without being split.

Generally, the optical branching filter, optical coupler and DCF are optical parts which suffer large losses, and therefore using the optical coupler/branching filter and DCF in series results in an increased loss, making a long distance transmission difficult.

SUMMARY OF THE INVENTION

An object of the present invention is to provide an optical transmission unit which is capable of performing the coupling and branching of individual wavelengths at a data rate of 10 Gbits/s.

In order to achieve the above objective, the inventive optical coupler/branching filter is designed to set proper values of dispersion compensation depending on the state of transmission path.

The loss of signal light caused by using an optical coupler, an optical branching filter and DCF together is compensated by means of a plurality of low-excitation optical amplifiers, thereby enabling a long-distance transmission.

These and other objects and many of the attendant advantages of the invention will be readily appreciated, as the same becomes better understood by reference to the following detailed description when considered in connection with the accompanying drawings.

DESCRIPTION OF THE PREFERRED EMBODIMENTS

The embodiments of this invention will be explained in detail with reference to the drawings.

Figure 1:
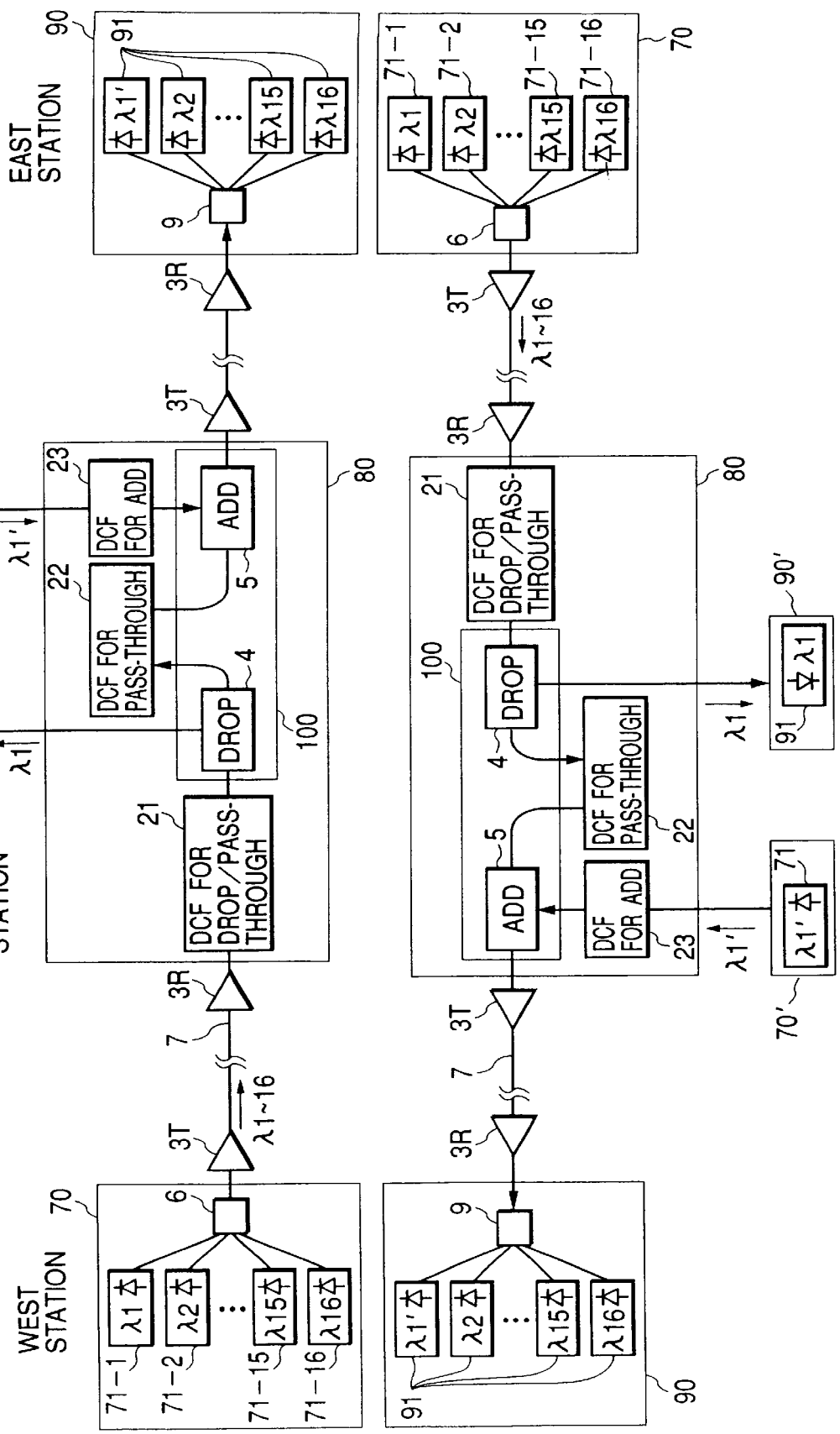
FIG. 1 is a block diagram of a bidirectional optical transmission system which is an embodiment of this invention.

FIG. 1 shows by block diagram a bidirectional optical transmission system which is an embodiment of this invention. West station is equipped with an optical transmission unit 70 for the W–E (from West to East) transmission, a transmission optical amplifier 3T, an optical receiving unit 90 for the E–W (from East to West) receiving, and a receiving optical amplifier 3R. East station is equipped with an optical transmission unit 70 for the E–W transmission, a transmission optical amplifier 3T, an optical receiving unit 90 for the W–E receiving, and a receiving optical amplifier 3R. The West station and East stations can communicate with each other through a transmission path 7 at a data rate of 10 Gbits/s. Center station which is located between the West and East stations is equipped for the W–E transmission with a receiving optical amplifier 3R, an optical coupling/branching & dispersion compensator 80, a transmission optical amplifier 3T, a split light signal receiver 90', and a coupled light signal transmitter 70'. It also has the same equipment for the E–W transmission.

The transmission path 7 is NDSF, which is common to all embodiments of this invention.

The optical transmission unit 70 includes 16 optical transmitters 71-1 through 71-16 for signal light transmission of different wavelengths $\lambda 1$–$\lambda 16$ ($\lambda 1 < \lambda n < \lambda 16$, n=2–15), and a wavelength multiplexer 6 which wavelength-multiplexes the signal lights for transmission. The optical receiving unit 90 includes a wavelength demultiplexer 9 which demultiplexes a wavelength-multiplexed light signal being transmitted over the transmission path 7 into signal lights of the wavelengths $\lambda 1$–$\lambda 16$, and transmits the demultiplexed signal lights to 16 optical receivers 91. The multiplexed signal lights being transmitted over the transmission path 7 does not necessarily include all of the wavelengths. Each optical receiver 91 has a wide receiving wavelength band to be receptible of any wavelength. DCFs (not shown) are placed between the wavelength multiplexer 6 of optical transmission unit 70 and the sending optical amplifier 3T, and between the wavelength demultiplexer 9 of optical reception unit 90 and the receiving optical amplifier 3R.

The optical coupling/branching & dispersion compensator 80 includes a DCF 21 through which a split wavelength and wavelengths passing through an optical coupling/branching unit 100 pass, an optical branching filter 4 which branches a signal light of wavelength λ1, a DCF 22 through which the wavelengths passing through the optical coupling/branching unit 100 pass, a DCF 23 through which a wavelength λ1' (λ1'=λ1) to be coupled from an optical transmission unit 70' passes, and an optical coupler 5 which couples the signal light from the DCF 23 to the signal light from the DCF 22.

The DCFs 21, 22 and 23 are determined to have dispersion values of −600 ps/nm, −500 ps/nm and −400 ps/nm, respectively. Accordingly, the split wavelength has a dispersion value of −600 ps/nm, the wavelengths passed through the optical coupling/branching unit 100 have a dispersion value of −1100 ps/nm, and the coupled wavelength has a dispersion value of −400 ps/nm.

The DCFs have their dispersion values determined appropriately depending on the dispersion values of the transmission path for receiving and that for transmitting. This affair is common to all embodiments of this invention. The optical branching filter 4 is of the filter type and the optical coupler 5 is of the coupler type throughout the embodiments.

Based on this system configuration, it is possible for a split wavelength, pass-through wavelengths and coupled wavelength to have dispersion compensation at proper dispersion values depending on individual transmission distances, thereby enabling the high-speed transmission at 10 Gbits/s.

Although λ1' is equal to λ1 in this embodiment, it may be different, provided that it is not used between other transmitter and receiver in the same segment. This affair is a common to all embodiments of this invention.

In this embodiment, the optical branching filter 4 and coupler 5 are designed to be a module of a printed circuit board having optical connectors (not shown), and it is used commonly as an optical coupling/branching unit 100 as will be explained in the following.

Figure 2:
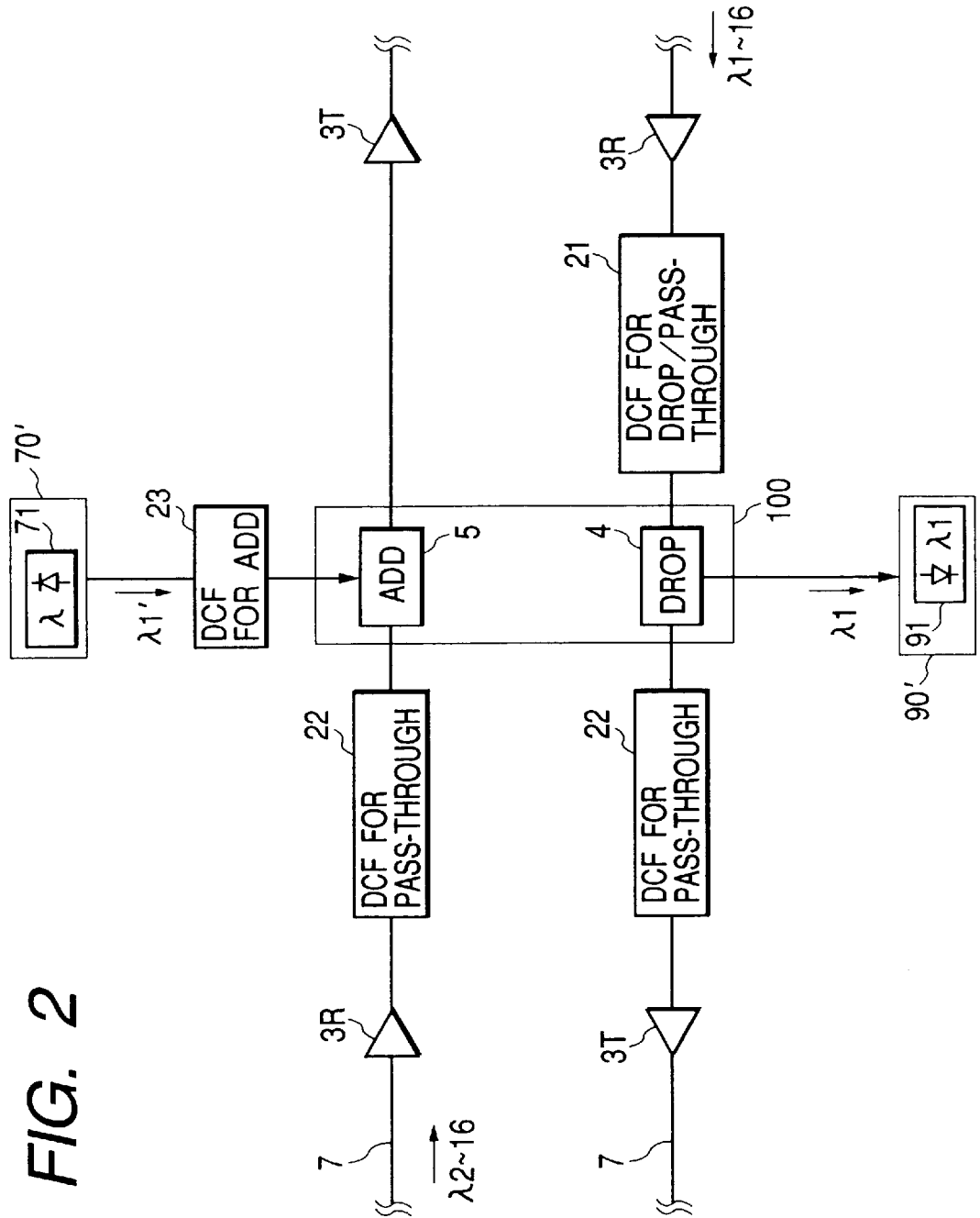
FIG. 2 is a block diagram of a bidirectional optical transmission system which is another embodiment of this invention.
Figure 3:
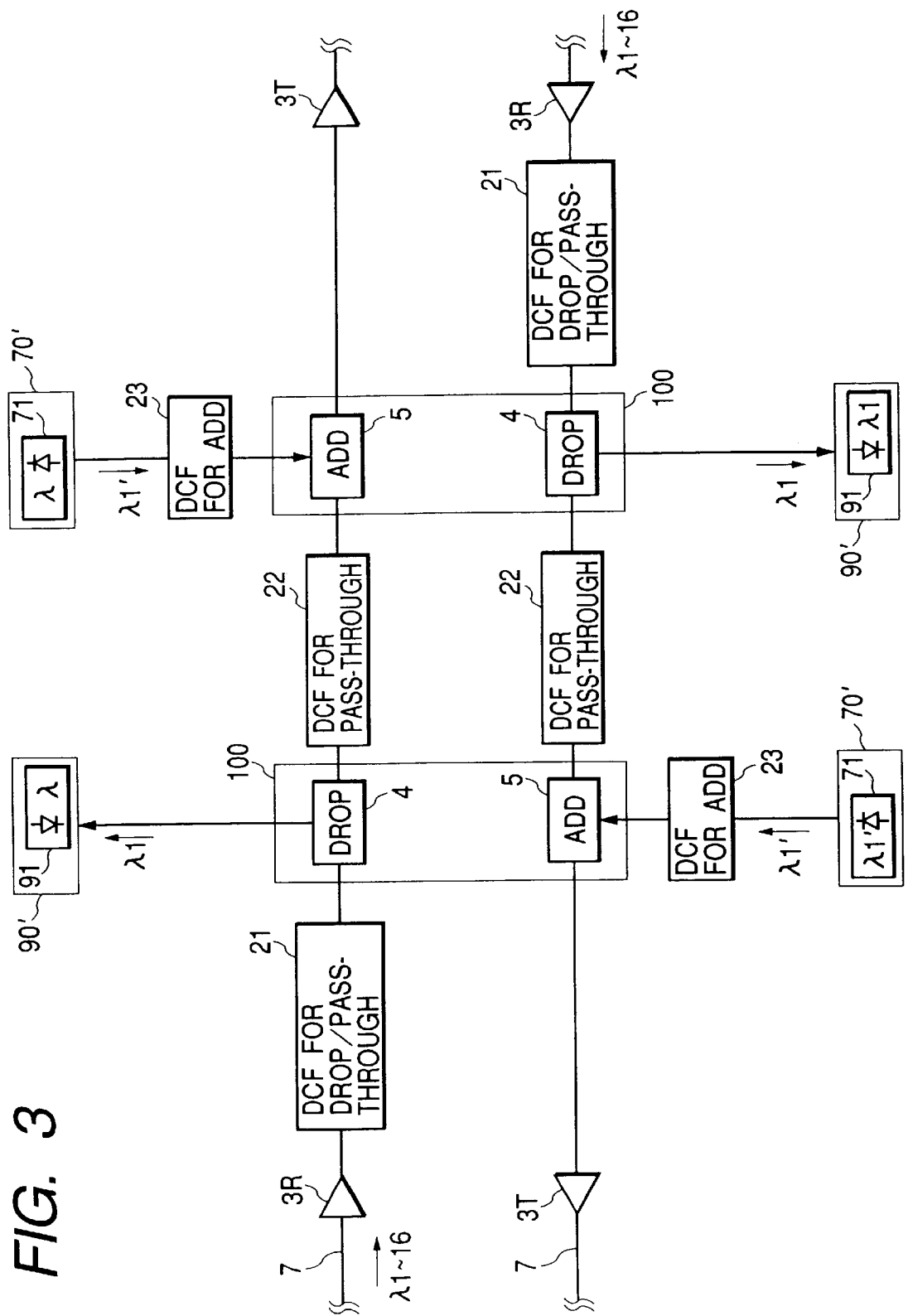
FIG. 3 is a block diagram of a bidirectional optical transmission system which is another embodiment of this invention.

FIG. 2 and FIG. 3 show bidirectional optical transmission systems which are other embodiments of this invention. In the figures, East and West stations are omitted, and the same functional blocks are referred by the common reference numerals unless otherwise needed.

Center station of FIG. 2 is characterized by using one optical coupling/branching unit 100 for both the coupling of W–E transmission and branching of E–W transmission, while the optical coupling/branching units shown in FIG. 1 are used one for the W–E transmission and E–W transmission respectively.

Specifically, the wavelength-multiplexed signal light (λ2–λ16) amplified by the receiving optical amplifier 3R of W–E transmission passes through the DCF 22 which is used for the wavelengths passing through the Center station, thereby undergoing the dispersion compensation. The multiplexed signal light having passed through the DCF 22 and the signal light of wavelength λ1 having been transmitted from the optical transmission unit 70 and having passed through the DCF 23 are multiplexed by the coupler 5, amplified by the transmission optical amplifier 3T, and transmitted over the transmission path 7. The wavelength-multiplexed signal (λ1–λ16) amplified by the receiving optical amplifier 3R of E–W transmission passes through the DCF 21 which is used for the wavelengths passing through the Center station and the wavelength to be split, thereby under going the dispersion compensation. The optical branching filter 4 extracts the signal light of wavelength λ1, which is then transmitted to the optical receiving unit 90. The remaining multiplexed signal (λ2–λ16) is given second dispersion compensation by the DCF 22 which is used for wavelengths passing through the Center station, amplified by the transmission optical amplifier 3T, and then sent out over the transmission path 7.

The DCF 22 and DCF 23 for W–E transmission have their dispersion values selected to be −1100 and −400 ps/nm, respectively, and the DCF 21 and DCF 22 for E–W transmission have their dispersion values selected to be −600 and −500 ps/nm, respectively. Consequently, the split wavelength, the wavelengths passing through the optical coupling/branching unit 100, and the coupled wavelength can have dispersion values of −600 ps/nm, −1100 ps/nm, and −400 ps/nm, respectively, as in the case of the embodiment shown in FIG. 1.

In this embodiment, the Center station can perform the high-speed communication at 10 Gbits/s only with the East station but not with the West station. This system performance is sufficient for some operation, and is advantageous in having only one optical coupling/branching unit. In this case, when the Center station develops a need of communication with the West station, it is equipped with another optical coupling/branching unit 100' for the communication with the West station, and the DCFs are replaced appropriately to match with the transmission path.

This embodiment is useful for constructing a transmission system which matches with a demanded type of communication, while minimizing the initial construction cost.

Figure 4:
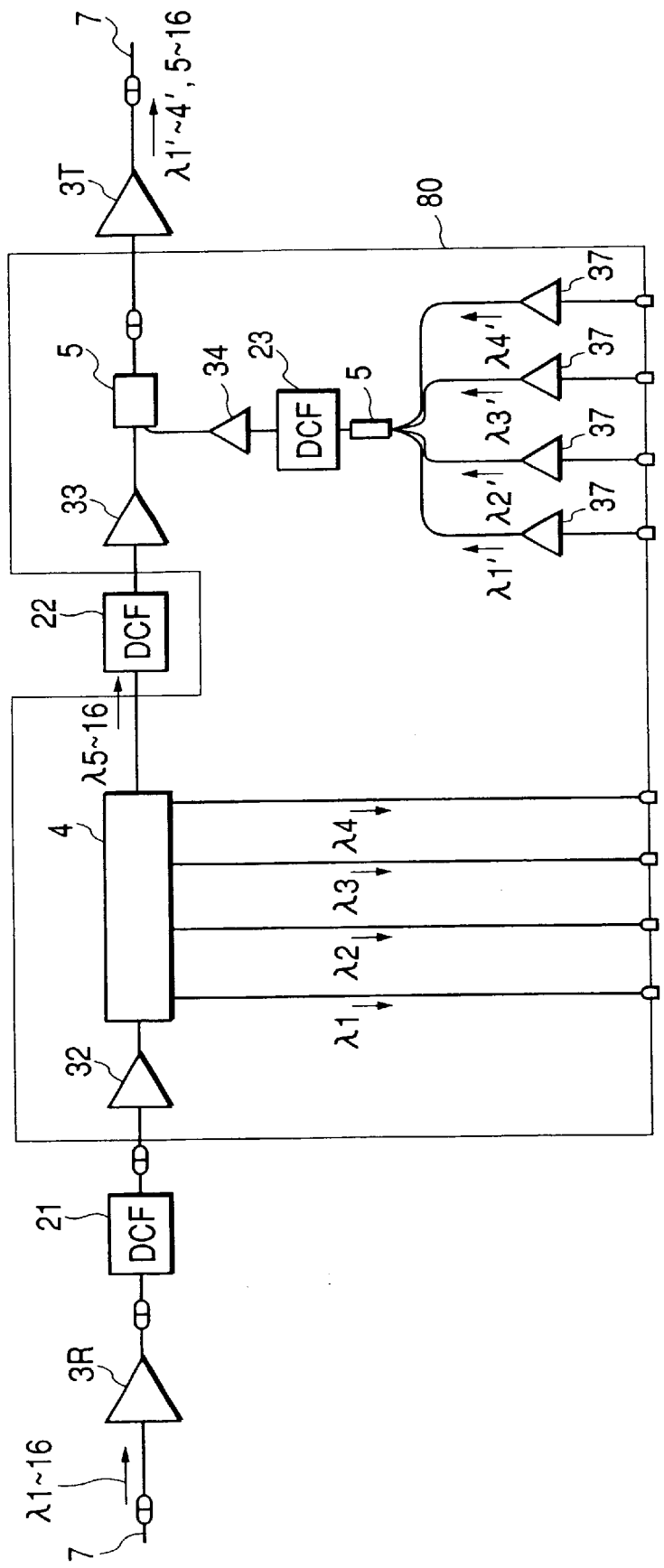
FIG. 4 is a block diagram of an optical transmission unit which is an embodiment of this invention.
Figure 7:
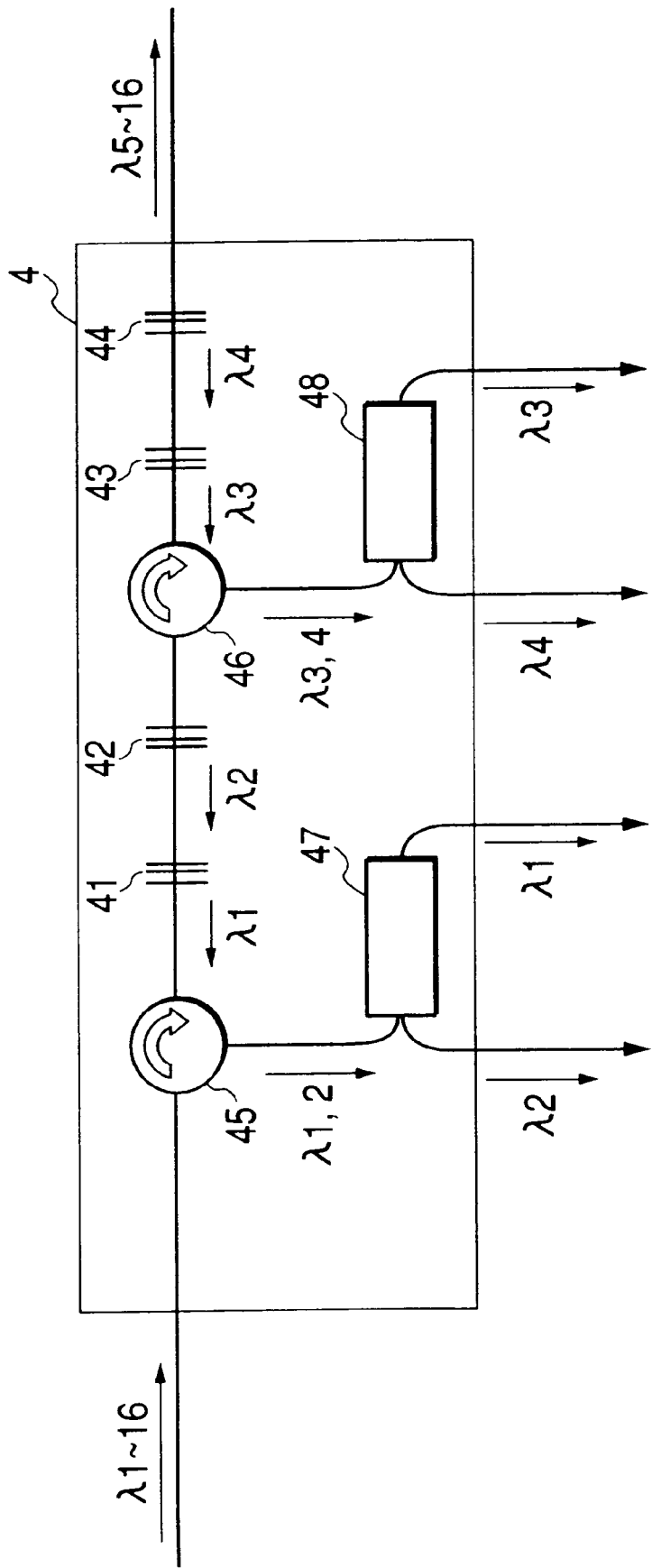
FIG. 7 is a block diagram of an optical branching filter which is an embodiment of this invention.

An optical transmission unit which is an embodiment of this invention will be explained with reference to the block diagram of FIG. 4 and also in connection with FIG. 7.

A wavelength-multiplexed signal light (λ1–λ16) inputted over the transmission path 7 is amplified by a receiving optical amplifier 3R, and then passes through a DCF 21 which is provided for wavelengths λ1–λ4 to be split. The multiplexed signal light (λ1–λ16) which is weakened by having passed through the DCF 21 is amplified by an optical amplifier 32. Signal lights of wavelengths λ1–λ4 are split out of the amplified signal light (λ1–λ16) by an optical branching filter 4 and outputted to the outside. The remaining multiplexed signal light (λ5–λ16) passes through a DCF 22 which is provided for pass-through in consideration of dispersion by the DCF 21. The multiplexed signal light (λ5–λ16) is amplified again by an optical amplifier 33 to regain the light level which has been weakened by the branching filter 4 and DCF 22.

Signal lights of wavelengths λ1'–λ4' (λn'=λn, n=1–4) which are inputted from the outside are amplified by optical amplifiers 37 so as to have their light levels adjusted individually. The signal lights of λ1'–λ4' are next multiplexed by an optical coupler 5, and the resulting wavelength-multiplexed signal light (λ1'–λ4') passes through a DCF 23 which is provided for coupling. The multiplexed signal light (λ1'–λ4') which has been weakened by the optical coupler 5 and DCF 23 is amplified by an optical amplifier 34. The amplified multiplexed signal light (λ1'–λ4') is multiplexed with the multiplexed signal light (λ5–λ16) by an optical coupler 5. The resulting wavelength-multiplexed signal light (λ1'–λ4' plus λ5–λ16) is amplified by a transmission optical amplifier 3T, and then outputted over the transmission path 7.

In regard to the parameters of devices used in this embodiment, the DCF 21 has a dispersion value of −600 ps/nm and a loss of 5.0 dB, the DCF 22 has a dispersion value of −500 ps/nm and a loss of 4.5 dB, the DCF 23 has a dispersion value of −400 ps/nm and a loss of 4.0 dB, the optical branching filter 4 has a loss of 3.5 dB, and the optical coupler 5 has a loss of 3.0 dB.

The receiving optical amplifier 3R is excited by a pumping light of 120 mW to have a gain of 21.0 dB, the optical amplifiers 32, 33 and 34 are excited by a pumping light of 25 mW to have a gain of around 11.0 dB, the optical amplifier 37 is excited by a pumping light of 25 mW to have a gain of around 6.0 dB, and the transmission optical amplifier 3T is excited by a pumping light of 150 mW to have a gain of 17.0 dB. The optical amplifiers 32, 33 and 34 may be excited by a pumping light of 50 mW.

Although in this embodiment, the signal light which is weakened in level by the DCFs, branching filter and coupler is amplified by three optical amplifiers, it can be treated by only one optical amplifier 32 having its erbium-doped optical fiber selected in length appropriately and being exciting with a pumping light of 150 mW. Alternatively, the signal light can be treated by two optical amplifiers 32 and 34 excited at 100 mW and 25 mW, respectively. However, using a number of low-excitation optical amplifiers will be less expensive to achieve a specific performance since pumping laser diodes are expensive increasingly as their power rating rises.

Next, the detailed structure of the optical branching filter 4 will be explained with reference to the block diagram of FIG. 7.

A transmitting wavelength-multiplexed signal light including wavelengths $\lambda 1$–$\lambda 16$ passes through an optical circulator 45, and has its wavelengths $\lambda 1$ and $\lambda 2$ reflected by black gratings 41 and 42, respectively. The remaining multiplexed signal light of $\lambda 3$–$\lambda 16$ passes through another optical circulator 46, and has its wavelengths $\lambda 3$ and $\lambda 4$ reflected in a similar way. The remaining multiplexed signal light of $\lambda 5$–$\lambda 16$ is passed through the optical branching filter 4.

The optical circulators 45 and 46 are designed to conduct a light from left to right on the drawing, while rotating a right-to-left light clockwise and outputting it to the third port. Accordingly, the signal lights of $\lambda 1$ and $\lambda 2$ are directed to the optical branching filter 47 to be separated in wavelength as above-mentioned way. The signal lights of $\lambda 3$ and $\lambda 4$ are separated in a similar way.

By the way, the optical branching filters 47 and 48 may otherwise be the waveguide type multiplexers. The optical branching filter 4 may be a WDM (Wavelength Division Multiplexer/Demultiplexer) of other kind.

According to this embodiment, it becomes possible to retain a high signal light level by amplifying with optical amplifiers the signal lights which are weakened by the DCFs, branching filter and coupler. Retaining a high signal light level prevents the deterioration of noise figure for a long-distance transmission, and enables a long-distance transmission, with optical couplers/branching filters being used.

Figure 5:
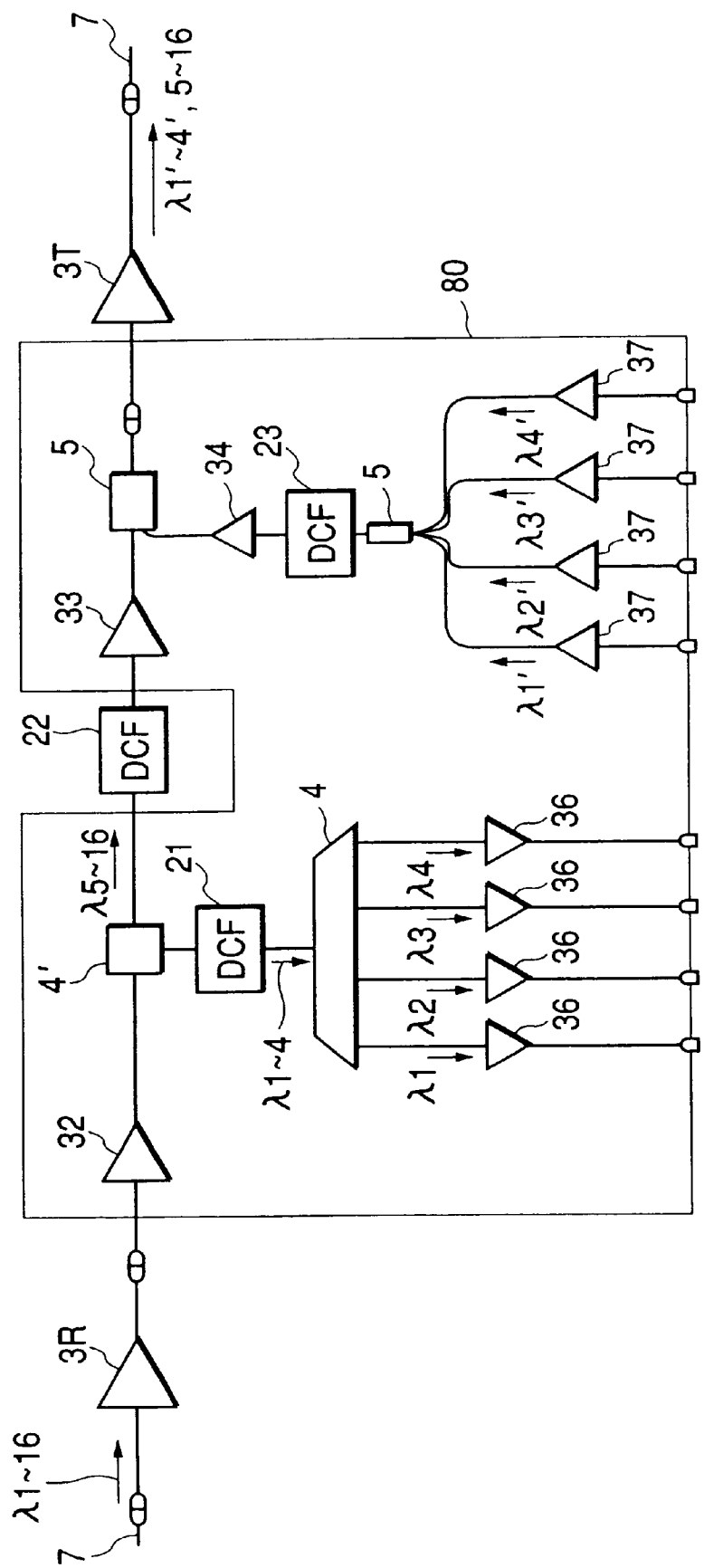
FIG. 5 is a block diagram of an optical transmission unit which is another embodiment of this invention.

FIG. 5 shows by block diagram an optical transmission unit which is another embodiment of this invention. A wavelength-multiplexed signal light ($\lambda 1$–$\lambda 16$) inputted over the transmission path 7 is amplified by a receiving optical amplifier 3R and further amplified by an optical amplifier 32, and fed to an optical branching filter 4'. A multiplexed signal light of wavelengths $\lambda 1$–$\lambda 4$ split by the branching filter 4' passes through a DCF 21 which is used for $\lambda 1$–$\lambda 14$. The multiplexed signal light of $\lambda 1$–$\lambda 4$ passing through the DCF 21 is demultiplexed by a branching filter 4 into individual signal lights, and then amplified by optical amplifiers 36 to regain their levels which have been weakened by the DCF 21 and optical branching filter 4.

The remaining multiplexed signal light of $\lambda 5$–$\lambda 16$ which has passed through the optical branching filter 4' passes through a DCF 22 which is provided for pass-through. The multiplexed signal light of $\lambda 5$–$\lambda 16$ is amplified by optical amplifiers 33 to regain the level which has been weakened by the optical branching filter 4' and DCF 22.

Signal lights of $\lambda 1'$–$\lambda 4'$ inputted from the outside are amplified by optical amplifiers 37 so as to have their light levels adjusted individually. The signal lights of $\lambda 1'$–$\lambda 4'$ are multiplexed by an optical coupler 5, and then passes through a DCF 23 which is provided for the wavelength multiplexed signal lights ($\lambda 1'$–$\lambda 4'$). The multiplexed signal light ($\lambda 1'$–$\lambda 4'$) is amplified by an optical amplifier 34 to regain the level which has been weakened by the coupler 5 and DCF 23. The amplified wavelength multiplexed signal light ($\lambda 1'$–$\lambda 4'$) is multiplexed with the wavelength multiplexed signal light ($\lambda 5$–$\lambda 16$) by an optical coupler 5. The resulting multiplexed signal light ($\lambda 1'$–$\lambda 4'$ plus $\lambda 5$–$\lambda 16$) is amplified by a transmission optical amplifier 3T, and then outputted over the transmission path 7.

In regard to the parameters of devices used in this embodiment, the DCF 21 has a dispersion value of −600 ps/nm and a loss of 5.0 dB, the DCF 22 has a dispersion value of −1100 ps/nm and a loss of 9.5 dB, the DCF 23 has a dispersion value of −400 ps/nm and a loss of 4.0 dB, the optical branching filter 4 has a loss of 3.0 dB, and the optical coupler 5 has a loss of 3.0 dB. The receiving optical amplifier 3R is excited by a pumping light of 120 mW to have a gain of 21.0 dB, the optical amplifiers 32, 33 and 34 are excited by a pumping light of 25 mW to have a gain of around 11.0 dB, the optical amplifier 37 is excited by a pumping light of 25 mW to have a gain of around 6.0 dB, and the transmission optical amplifier 3T is excited by a pumping light of 150 mW to have a gain of 17.0 dB.

According to this embodiment, it becomes possible to retain a high signal light level by amplifying with optical amplifiers the signal lights which are weakened by the DCFs, branching filter and coupler, thereby. Retaining a high signal light level prevents the deterioration of noise figure for a long-distance transmission, and enables a long-distance transmission, with optical coupling/branching units being used.

Figure 6:
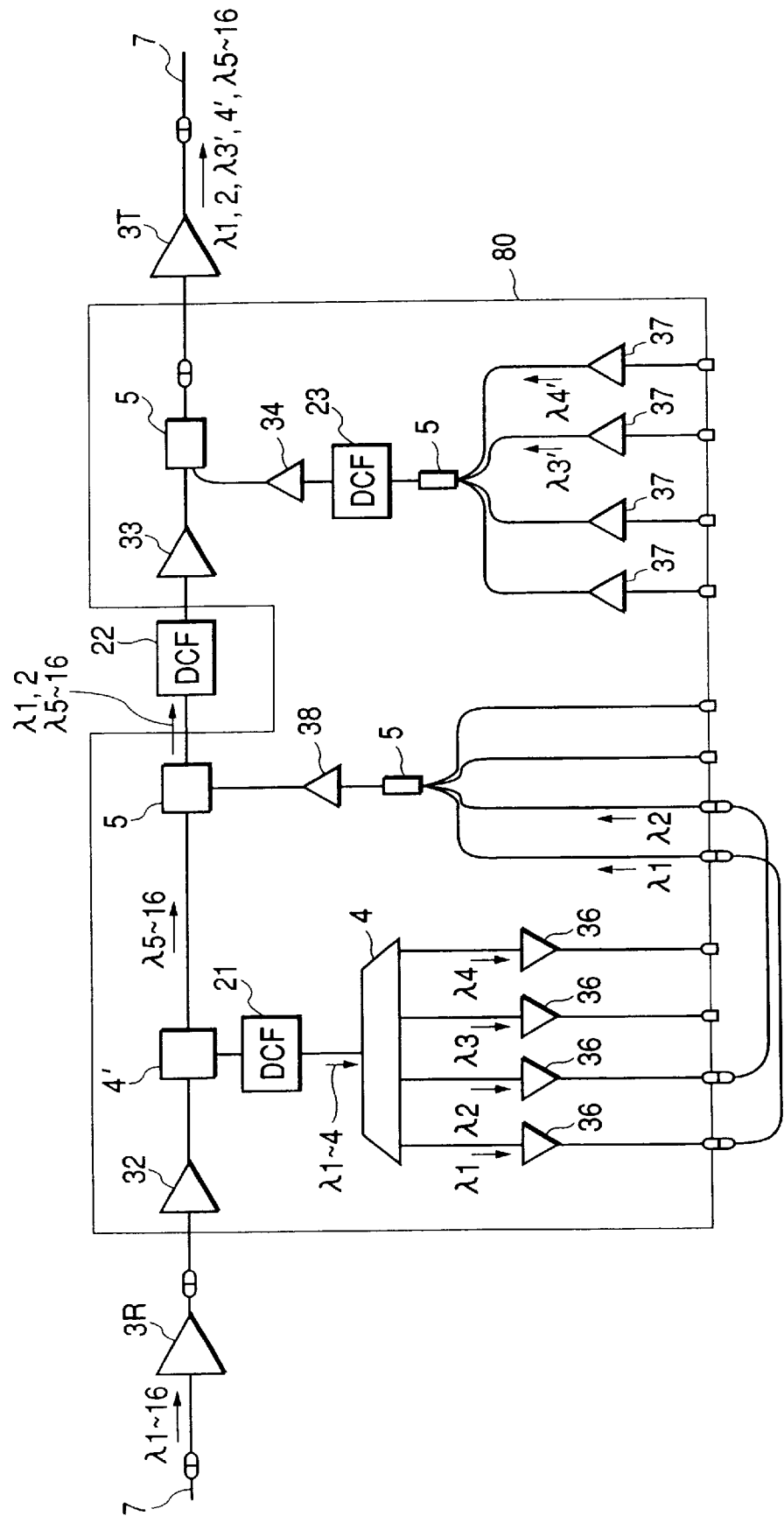
FIG. 6 is a block diagram of an optical transmission unit which is another embodiment of this invention.

FIG. 6 shows by block diagram an optical transmission unit which is still another embodiment of this invention, and is basically the same in structure as the unit shown in FIG. 5. The same portions are referred by the common reference numerals as the above-mentioned embodiments.

This embodiment is characterized by the provision of an optical coupler 5 between the optical branching filter 4' and DCF 22, so that part of the wavelengths which have been split by the branching filter 4' is coupled again and treated to pass through the optical transmission unit. This arrangement is intended for expectation of an increased traffic volume of the place where the optical transmission unit is installed. The optical transmission unit is initially used for the band of transmission between other places, and when the volume of transmission of this place increases, it can be used for the transmission between this place and other place. This embodiment effects the capability of varying the number of wavelengths depending on the data traffic volume of the place where the transmission unit is installed.

Figure 8:
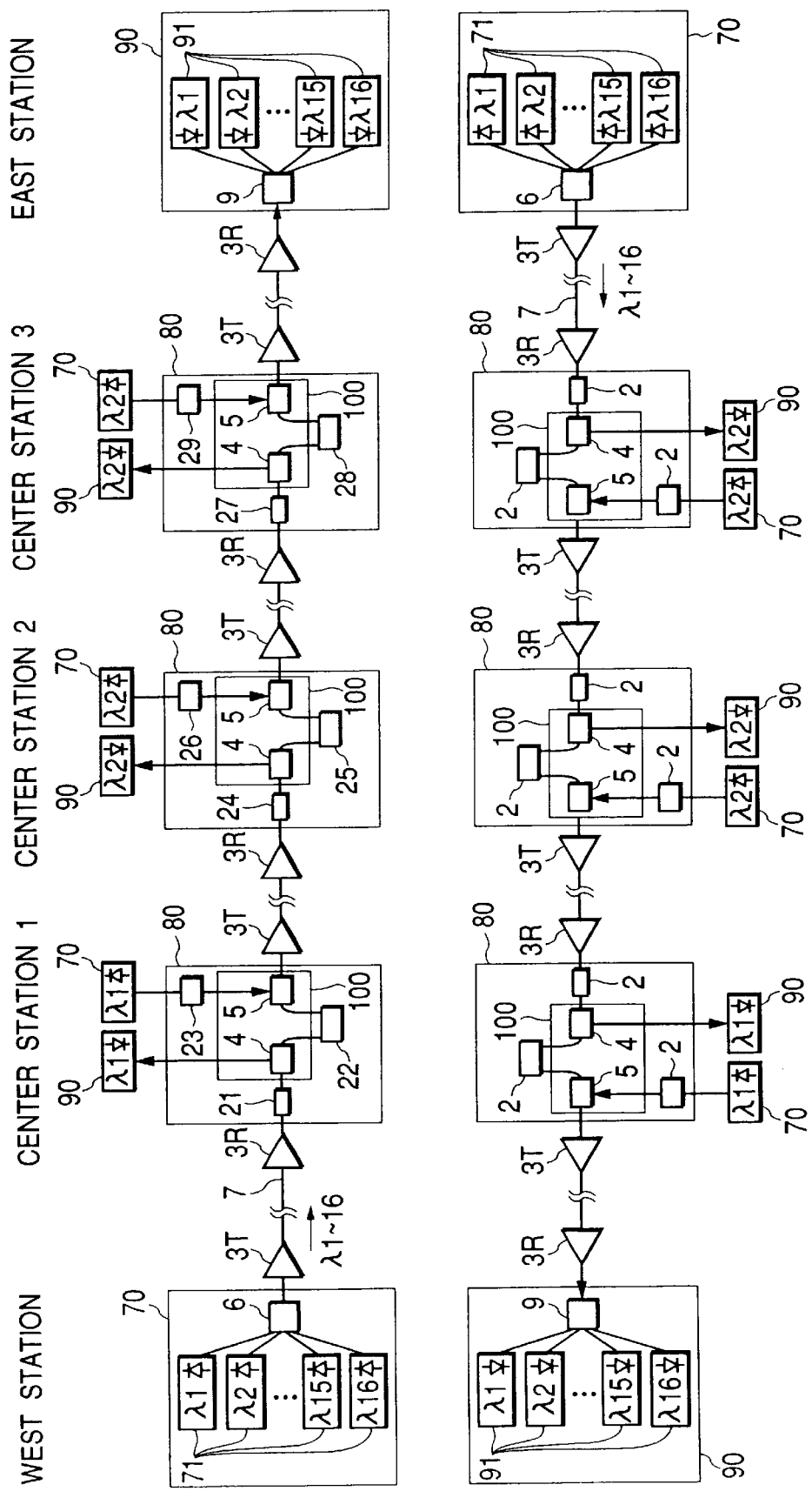
FIG. 8 is a block diagram of a bidirectional optical transmission system which is another embodiment of this invention.

FIG. 8 shows by block diagram a bidirectional optical transmission system based on another embodiment of this invention. This system is characterized by including a number of Center stations, in contrast to the system of FIG. 1 which includes only one Center station.

The wavelength-multiplexed signal ($\lambda 1$–$\lambda 16$) amplified by the receiving optical amplifier 3R for W–E transmission equipped in Center station 1 first passes through the DCF 21. The signal next passes through the optical branching filter 4, which splits the light of wavelength $\lambda 1$ out of the multiplexed signal. The remaining multiplexed signal ($\lambda 2$–$\lambda 16$) passes through the DCF 22 so that it is rendered the dispersion compensation. The wavelength-multiplexed light which has passed the DCF 22 and the signal light of wavelength $\lambda 1$ transmitted from the optical transmission unit 70 and passing through the DCF 23 are multiplexed by the optical coupler 5, amplified by the transmission optical amplifier 3T, and outputted to the transmission path 7. The same arrangement is equipped for E–W transmission.

The wavelength-multiplexed signal ($\lambda 1$–$\lambda 16$) transmitted from the Center station 1 is amplified by the receiving optical amplifier 3R for W–E transmission equipped in Center station 2, and it first passes through the DCF 24. The signal next passes through the optical branching filter 4, which splits the light of wavelength $\lambda 2$ out of the multiplexed signal. The remaining multiplexed signal ($\lambda 1$, $\lambda 3$–16) passes through the DCF 25 so that it is rendered the dispersion compensation. The wavelength-multiplexed light which has passed the DCF 25 and the signal light of wavelength $\lambda 2$ transmitted from the optical transmission unit 70 and passing through the DCF 26 are multiplexed by the optical coupler 5, amplified by the transmission optical amplifier 3T, and outputted to the transmission path 7. The same arrangement is equipped for E–W transmission.

The wavelength-multiplexed signal ($\lambda 1$–$\lambda 16$) transmitted from the Center station 2 is amplified by the receiving optical amplifier 3R for W–E transmission equipped in Center station 3, and it first passes through the DCF 27. The signal next passes through the optical branching filter 4, which splits the light of wavelength $\lambda 2$ out of the multiplexed signal. The remaining multiplexed signal ($\lambda 1$, $\lambda 3$–$\lambda 16$) passes through the DCF 28 so that it is rendered the dispersion compensation. The wavelength-multiplexed light which has passed the DCF 28 and the signal light of wavelength $\lambda 2$ transmitted from the optical transmission unit 70 and passing through the DCF 29 are multiplexed by the optical coupler 5, amplified by the transmission optical amplifier 3T, and outputted to the transmission path 7. The same arrangement is equipped for E–W transmission.

The DCFs have their dispersion values determined appropriately depending on the dispersion values of the transmission path for receiving and that for transmission. In this example, dispersion values for the compensation of wavelengths are set to be: DCF21: −600 ps/nm, DCF22: −500 ps/nm, DCF23: −400 ps/nm, DCF24: −300 ps/nm, DCF25: −250 ps/nm, DCF26: −200 ps/nm, DCF27: −300 ps/nm, DCF28: −500 ps/nm, DCF29: −400 ps/nm.

This system can accomplish the high-speed communication at 10 Gbits/s between the West or East station and a number of center stations. By use of this system, the high-speed transmission at 10 Gbits/s among a number of Center stations can be accomplished also.

FIG. 8 shows by block diagram a bidirectional optical transmission system based on another embodiment of this invention. This system is characterized by including a number of Center stations, in contrast to the system of FIG. 1 which includes only one Center station.

The wavelength-multiplexed signal ($\lambda 1$–$\lambda 16$) amplified by the receiving optical amplifier 3R for W–E transmission equipped in Center station 1 first passes through the DCF 21. The signal next passes through the optical branching filter 4, which splits the light of wavelength $\lambda 1$ out of the multiplexed signal. The remaining multiplexed signal ($\lambda 2$–$\lambda 16$) passes through the DCF 22 so that it is rendered the dispersion compensation. The wavelength-multiplexed light which has passed the DCF 22 and the signal light of wavelength $\lambda 1$ transmitted from the optical transmission unit 70 and passing through the DCF 23 are multiplexed by the optical coupler 5, amplified by the transmission optical amplifier 3T, and outputted to the transmission path 7. The same arrangement is equipped for E–W transmission.

The wavelength-multiplexed signal ($\lambda 1$–$\lambda 16$) transmitted from the Center station 1 is amplified by the receiving optical amplifier 3R for W–E transmission equipped in Center station 2, and it first passes through the DCF 24. The signal next passes through the optical branching filter 4, which splits the light of wavelength $\lambda 2$ out of the multiplexed signal. The remaining multiplexed signal ($\lambda 1$, $\lambda 3$–16) passes through the DCF 25 so that it is rendered the dispersion compensation. The wavelength-multiplexed light which has passed the DCF 25 and the signal light of wavelength $\lambda 2$ transmitted from the optical transmission unit 70 and passing through the DCF 26 are multiplexed by the optical coupler 5, amplified by the transmission optical amplifier 3T, and outputted to the transmission path 7. The same arrangement is equipped for E–W transmission.

The wavelength-multiplexed signal ($\lambda 1$–$\lambda 16$) transmitted from the Center station 2 is amplified by the receiving optical amplifier 3R for W–E transmission equipped in Center station 3, and it first passes through the DCF 27. The signal next passes through the optical branching filter 4, which splits the light of wavelength $\lambda 2$ out of the multiplexed signal. The remaining multiplexed signal ($\lambda 1$, $\lambda 3$–$\lambda 16$) passes through the DCF 28 so that it is rendered the dispersion compensation. The wavelength-multiplexed light which has passed the DCF 28 and the signal light of wavelength $\lambda 2$ transmitted from the optical transmission unit 70 and passing through the DCF 29 are multiplexed by the optical coupler 5, amplified by the transmission optical amplifier 3T, and outputted to the transmission path 7. The same arrangement is equipped for E–W transmission.

The DCFs have their dispersion values determined appropriately depending on the dispersion values of the transmission path for receiving and that for transmission. In this example, dispersion values for the compensation of wavelengths are set to be: DCF21: −600 ps/nm, DCF22: −500 ps/nm, DCF23: −400 ps/nm, DCF24: −300 ps/nm, DCF25: −250 ps/nm, DCF26: −200 ps/nm, DCF27: −300 ps/nm, DCF28: −500 ps/nm, DCF29: −400 ps/nm.

This system can accomplish the high-speed communication at 10 Gbits/s between the West or East station and a number of center stations. By use of this system, the high-speed transmission at 10 Gbits/s among a number of Center stations can be accomplished also.

As described above, the present invention accomplishes an optical coupler/branching filter which is capable of setting a proper dispersion compensation value depending on the state of transmission path. Moreover, it becomes possible to compensate the loss of signal light caused by using optical coupler/branching filters and DCFs together by means of a plurality of low-excitation optical amplifiers, and thereby enable a long-distance transmission.

It is further understood by those skilled in the art that the foregoing description is a preferred embodiment of the disclosed device and that various changes and modifications may be made in the invention without departing from the spirit and scope thereof.

What is claimed is:

1. An optical transmission unit comprising:
    a first dispersion compensator which compensates dispersion of a first wavelength-multiplexed signal light,
    a first optical amplifier which amplifies an output of said first dispersion compensator,
    an optical branching filter which splits the first wavelength-multiplexed signal light which has been amplified by said first optical amplifier into at least a second wavelength-multiplexed signal light and a first signal light,
    a second dispersion compensator which compensates dispersion of the second wavelength-multiplexed signal light, and
    a second optical amplifier which amplifies an output of said second dispersion compensator.

2. An optical transmission unit according to claim 1, wherein said first and second optical amplifiers include pumping laser diodes having inputs of 50 mW or less.

3. An optical transmission unit comprising:
    a first dispersion compensator which compensates dispersion of a first wavelength-multiplexed signal light,
    a first optical amplifier which amplifies an output of said first dispersion compensator,
    a second dispersion compensator which compensates dispersion of a first signal light,
    a second optical amplifier which amplifies an output of said second dispersion compensator, and
    an optical coupler which couples an output of said second optical amplifier to an output of said first optical amplifier.

4. An optical transmission unit according to claim 3, wherein said first and second optical amplifiers include pumping laser diodes having inputs of 50 mW or less.

5. An optical coupling/branching unit comprising:
    an optical branching filter which receives a first wavelength-multiplexed signal light which is an output of a first dispersion compensator, outputs a signal light of a first wavelength to an optical receiving unit, and outputs a second wavelength-multiplexed signal light to a second dispersion compensator, and
    an optical coupler which receives and couples by wavelength multiplexing an output of said second dispersion compensator and an output of a third dispersion compensator and outputs a third wavelength-multiplexed signal light.

6. An optical transmission system comprising a first terminal station which transmits a first wavelength-multiplexed signal light at about 10 Gbits/s; a repeater station which receives the first wavelength-multiplexed signal light and transmits a third wavelength-multiplexed signal light; and a second terminal station which receives the third wavelength-multiplexed signal light;
    said repeater station including:
        a first dispersion compensator which compensates the dispersion of the first wavelength-multiplexed signal light,
        an optical receiver which receives a first signal light included in the first wavelength-multiplexed signal light whose dispersion has been compensated,
        a second dispersion compensator,
        an optical branching filter which splits a signal light of a first wavelength from the first wavelength-multiplexed signal light whose dispersion has been compensated, transmits the split signal light to said optical receiver and transmits a second wavelength-multiplexed signal light to said second dispersion compensator,
        an optical transmitter which transmits a second signal light of the first wavelength,
        a third dispersion compensator which compensates dispersion of the second signal light from said optical transmitter, and
        an optical coupler which receives an output of said second dispersion compensator and an output of said third dispersion compensator and transmits the third wavelength-multiplexed signal light.

* * * * *